UNITED STATES PATENT OFFICE.

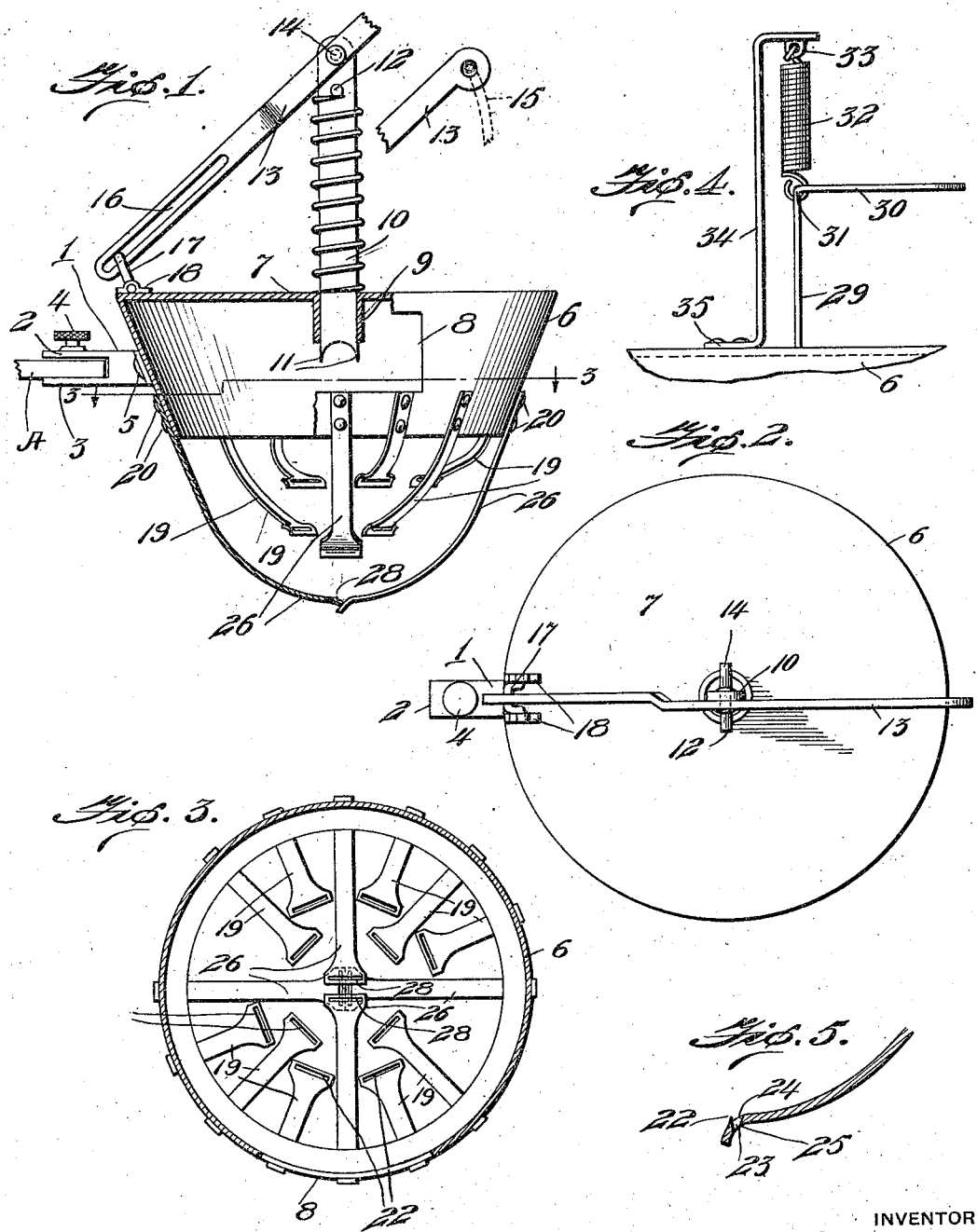

GEORGE LYNG, OF IRON RIVER, MICHIGAN.

POTATO-PEELING MACHINE.

1,237,251.   Specification of Letters Patent.   Patented Aug. 14, 1917.

Application filed June 13, 1916. Serial No. 103,535.

*To all whom it may concern:*

Be it known that I, GEORGE LYNG, a citizen of the United States, residing at Iron River, in the county of Iron and State of Michigan, have invented certain new and useful Improvements in Potato-Peeling Machines, of which the following is a specification.

My invention relates to a peeling machine particularly adapted for paring such articles of food as potatoes, peaches, pears, apples and the like all of which have a more or less oval or spherical form.

One object of the present invention resides in providing a machine of the character above mentioned which by a single stroke of the arm will effect the complete removal or paring of the skin of the potato or the like which is being operated upon.

A further object resides in providing a device of the character set forth which is exceedingly simple in construction and comprises a minimum number of parts.

Another object resides in providing a device which is so constructed that it may be easily cleaned and kept in a sanitary condition, and is of a durable nature.

With the above and other objects in view, I will now proceed to describe a specific embodiment of the present invention which I have illustrated in the accompanying drawing forming a part of this specification and wherein:

Figure 1 is a side elevation of a peeling machine constructed in accordance with the present invention, but with a portion thereof broken away to disclose the details of the paring mechanism.

Fig. 2 is a top plan view.

Fig. 3 is a sectional view on the line 3—3 of Fig. 1.

Fig. 4 is a detail view showing a modified form of operating device, and

Fig. 5 is a section through one of the blades showing the manner of forming the same.

In detail:

The device comprises a bracket 1 which is provided with two members 2 and 3 adapted to fit over a table or the like A and be secured thereto by means of a thumb screw 4. The bracket 1 has secured thereto by means of rivets 5 or the like, a hopper structure 6 which is preferably of conical form and has its top closed as shown at 7. The bottom of the hopper 6 is open and an opening 8 is provided in the side thereof for purposes to be hereinafter set forth. On the axial line of the hopper and supported in the top 7 thereof is a vertical bearing 9 which carries a plunger 10 having engaging points 11 at the lower end thereof and a pin 12 at the upper end. The upper end of the plunger 10 is pivoted as at 14 to the lever 13. A cable 15 is attached to the outer end of the lever 13 and the rear end of said lever is slotted as shown at 16 and engages with a strap 17 pivoted in journals 18 carried at the edge of the top 7. Thus by pulling the cable 15, the plunger 10 may be reciprocated. The plunger 10 in its uppermost position has its lower end above the lower edge of the opening 8. Secured around the margin of the lower end of the hopper 6 are a plurality of springs 19 which are riveted in place as shown at 20 and are bent inwardly toward each other toward a common point as shown. These springs, at their lower ends, each carry a peeling blade 22 as best shown in Fig. 5. This blade is formed by merely aperturing the blades 19 as shown at 23 and turning the upwardly facing edge 22 inwardly and sharpening it so as to form a blade, while the downwardly facing edge is beveled as shown at 24 and turned outwardly as indicated at 25. These blades 22 are located adjacent the points on the springs 19. The blades 19 are located immediately adjacent the opening of the hopper 6 and exteriorly of and supported from the blades 19 is another series of blades 26 which have their points 29 meeting below the meeting point of the blades 19 and also provided with blades 28 similar to the blades 22. Thus, the blades 19 and 26 are arranged in tiers, and preferably in staggered relation with respect to each other. The operation of the device is as follows:

The potatoes are inserted one at a time through the opening 8 and engage with the point 11 on the reciprocable spindle and this is then moved downwardly by pulling the cable 15 and the body or the like is progressively forced through the springs 19 and 26 with the result that as it passes therethrough the blades 22 and 28 engage and peel the potato, the paring being shifted through the apertures in the springs to the outside of the device. The parings of the upper tier will pass through with the potato. In this way, the potatoes may be peeled as rapidly as they can be pushed through the machine.

Another manner of supporting the reciprocating spindle is shown in Fig. 4 wherein the top 7 of the hopper 6 carries the usual bearing 9 but the spindle, instead of being formed as the spindle 10 in the preceding figures is formed with a shank 29 having a right angle handle 30 provided at the top with a lug 31 connecting with a spring 32 having the other end connected with a lug 33 carried by an upright 34 supported by a foot 35 secured in any suitable way to the top 7 of the hopper 6.

It will be seen from the foregoing that I have provided an extremely simple machine for peeling potatoes and fruits, and while I have herein described a specific embodiment of the present invention it is nevertheless to be understood that, in practice, I may resort to such practical modifications thereof as fall within the scope of the invention as defined in the appended claims.

I claim:

1. A potato peeling machine including a hopper having a plurality of springs closing its lower end, a peeling blade carried by each spring, a plurality of peelers arranged in staggered relation above said springs, and means for forcing potatoes from said hopper to said springs, whereby said blades and peelers are caused to engage and peel the potatoes.

2. A potato peeling machine including a hopper, a plurality of peeling blades converging and forming a closure for the bottom of said hopper, the said blades being arranged in staggered relation, and means for forcing potatoes from said hopper past said blades, whereby said blades are caused to engage and peel the potatoes.

3. A potato peeling machine including a hopper having a plurality of springs closing its lower end and arranged in tiers and in staggered relation, a peeling blade carried by each individual spring, and means for progressively forcing potatoes from said hopper through the successive tiers of springs, whereby said blades are caused to engage and peel the potatoes.

4. A potato peeling machine including a hopper having a plurality of springs, the meeting ends of which close the lower end of the hopper, said springs being arranged in tiers, a peeling blade carried by each individual spring, the blades of one tier being staggered with respect to the blades of the adjacent tier, and means for progressively forcing potatoes from said hopper through said springs, whereby said blades are caused to engage and peel the potatoes.

5. A potato peeling machine including a conical hopper having an outlet at its smaller end, a plurality of springs arranged in tiers and having their ends disposed in staggered relation and closing said outlet, a peeling blade carried by each individual spring, and means for progressively forcing potatoes from said hopper through said springs and past said blade, whereby said blades are caused to engage and peel the potatoes due to the action of the springs.

6. A potato peeling machine including a conical hopper having an opening at its smaller end, a plurality of springs closing such smaller end and arranged in tiers, a peeling blade carried by each individual spring, the blade of one tier being staggered with respect to the blade of the adjacent tier, and means for progressively forcing potatoes from said hopper through said springs, whereby said blades are caused to engage and peel the potatoes as they pass thereby.

In testimony whereof I affix my signature in presence of two witnesses.

GEORGE LYNG.

Witnesses:
A. J. POHLAND,
H. VAN WAGNER.

Copies of this patent may be obtained for five cents each, by addressing the "Commissioner of Patents, Washington, D. C."